United States Patent Office 3,704,141
Patented Nov. 28, 1972

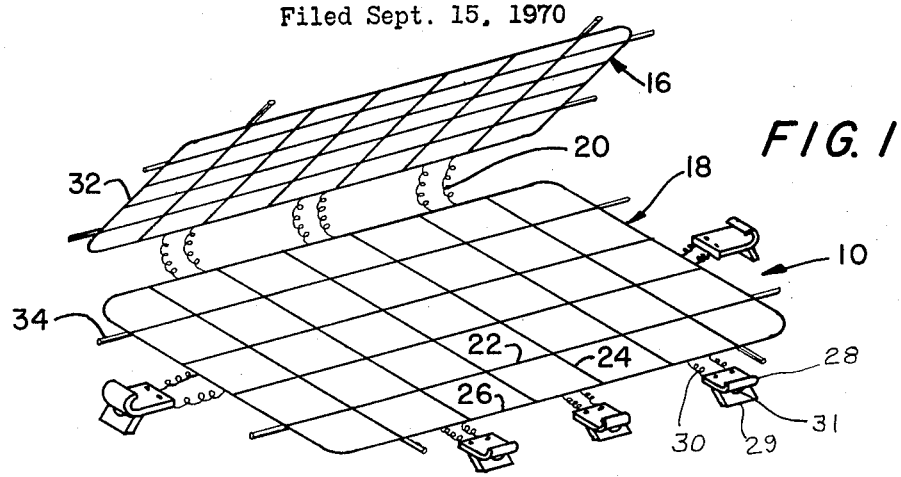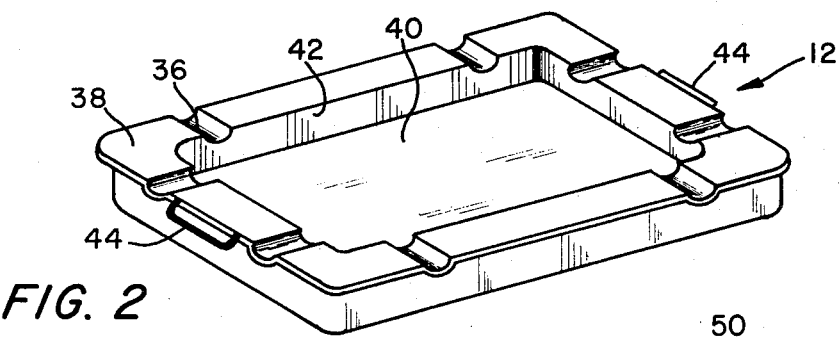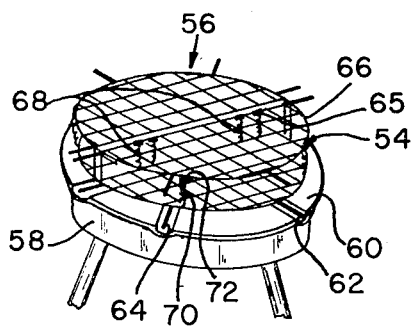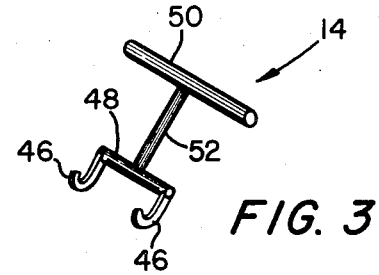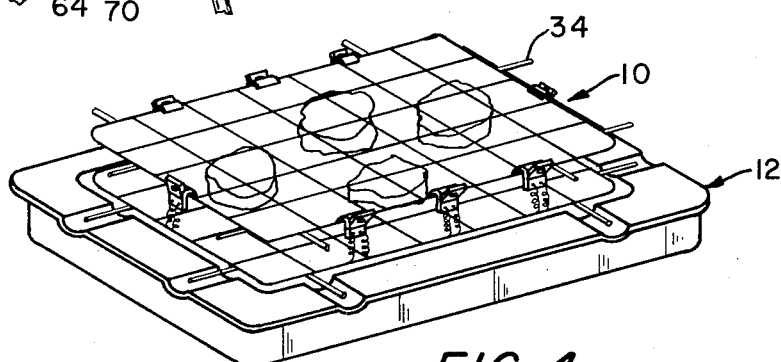

3,704,141
VARIABLE CAPACITY BROILING EQUIPMENT
Sidney Grossman, 180 Samoset Ave.,
Quincy, Mass. 02121
Filed Sept. 15, 1970, Ser. No. 72,439
Int. Cl. A47j 37/04
U.S. Cl. 99—397                                1 Claim

ABSTRACT OF THE DISCLOSURE

A variable capacity broiling rack is provided in combination with a cooperating broiling pan and a detachable handle for periodically turning the rack in the pan. The rack is provided with articulated grid work panels connected by extensible spring hinges and secured in the closed position with food therebetween by means of extensible spring latches. Outwardly extending supports seat in cooperating grooves formed in the pan. The handle is provided with a pair of spaced hook-like members for grasping the rack.

BACKGROUND OF THE INVENTION

(1) Field of the invention

This invention relates generally to cooking utensils and more particularly is directed towards a variable capacity broiling rack and cooperating pan for use in broiling and turning at one time a number of different types of food items of various sizes.

(2) Summary of the prior art

Conventional utensils for broiling food such as chickens, steaks and the like usually involve some type of perforated or openwork support positioned above a broiling pan which collects juices dropping from the meat. Typically, when the food is being broiled, it is necessary periodically to turn each piece individually to insure uniformity of cooking. Where a large number of food pieces are being broiled at one time, the turning of the meat pieces in a hot oven becomes a time-consuming and uncomfortable task when each piece must be turned individually. Accordingly, it is an object of the present invention to provide a new and improved variable capacity broiling rack adapted to accommodate a plurality of food items to be broiled whereby all pieces may be turned at one time. It is a further object of this invention to provide a variable capacity rack in combination with a cooperating pan into which the rack nests and a removable handle for use in turning the rack on the pan.

SUMMARY OF THE INVENTION

This invention features food broiling equipment comprising a variable capacity broiling rack having a pair of articulated, grid-work panels hinged to one another by means of extensible spring hinges and secured in the closed position by means of extensible spring latches disposed along the margin of one of the panels. Each panel is provided with outwardly extending supports adapted to nest in cooperating grooves formed in a drip-pan used in conjunction with the rack. A detachable handle includes a pair of spaced, hook-like members connected to a grip for use in picking up the rack and turning it from time-to-time.

BRIEF DESCRIPTION OF THE DRAWINGS

FIG. 1 is a view in perspective of a variable capacity rack made according to the invention and shown in the open position, FIG. 2 is a view in perspective of a cooperating pan made according to the invention, FIG. 3 is a view in perspective of the detachable handle, FIG. 4 is a view in perspective showing the rack in a closed position and mounted to the pan, and FIG. 5 is a view in perspective showing a modification of the invention.

DETAILED DESCRIPTION OF THE PREFERRED EMBODIMENTS

Referring now to the drawings and to FIGS. 1 through 4 in particular, the reference character 10 generally indicates a variable capacity broiling rack best shown in FIG. 1, the reference character 12 generally indicates a broiling pan best shown in FIG. 2, and the reference character 14 generally indicates a detachable handle best shown in FIG. 3.

The rack 10 is comprised of a pair of articulated panels 16 and 18 yieldingly connected to one another by means of extensible coil spring hinges 20 at opposite marginal edges of the panels. Each of the panels, in the preferred mode of the invention, is in the form of an open grid work of intersecting, mutually perpendicular ribs 22 and 24 surrounded by a marginal framing rib 26 of generally rectangular outline in the FIG. 1 embodiment. The ribs preferably are of metal such as a relatively thick stainless steel wire and may be coated with an anti-sticking plastic material such as sold under the trademark Teflon or the like. The ribs are fixed to one another at their points of intersection as by welding or the like to form a relatively rigid openwork panel, each coextensive with the other and hinged for opening and closing.

The panels are secured in their closed position by means of a plurality of hook-like members 28 spaced around the edges of the panel 18. Each hook-like member 28 is connected to its panel 18 by means of a pair of extensible coil springs 30 which permits the hook-like member 28 to be pulled up and over a marginal framing rib 32 of the opposing panel 16 to clamp the panels in a closed position. Each member 28 is in the form of a flat plate with a hooked end portion and a rearwardly extending tab 29 having an opening 31 formed therein. The tab facilitates pulling the hook over the rib 26 and, using the handle 14, the tab may be engaged by its hole to manipulate it when it is hot.

Since the hook-like members each is provided with a spring connection there is considerable yield provided and together with the spring hinges 20, the panels 16 and 18 may be clamped into a closed position at various distances from one another. This feature permits the rack to accommodate relatively thin pieces of food such as hamburgers, for example, or relatively thick irregularly shaped pieces such as chickens, potatoes or the like. Since the panels are connected at all sides by extensible springs, it is possible to place a variety of different foods to be broiled in the rack at one time. The thinner meats such as hamburgers may be placed at one end while the thicker pieces such as the chickens may be placed at the other end and the rack will accommodate itself accordingly, holding the pieces firmly in place.

Each panel is provided with a plurality of spaced, outwardly extending posts or supports 34 preferably formed by extending certain of the intersecting ribs 22 and 24 beyond the marginal framing ribs 26 and 32. The posts 34 are positioned about the rack to seat in outwardly extending notches or grooves 36 formed in a marginal rim or lip 38 of the pan 12. The pan 12 is formed with a recessed center portion 40 and surrounding upright walls 42 which terminate in the rim or lip 38. Handles 44 are provided at each end of the pan for lifting purposes.

The rack 10 is dimensioned to nest neatly over and partly in the pan 12 with the posts 34 seating in the cooperating grooves 36 while the grid portion of the rack, as defined by the marginal framing ribs 18 and 32, fits slightly down into the recessed portion of the pan, as best shown in FIG. 4. This insures that any juices dripping from the meat or other food held by the rack will collect in the pan, and also insures that the rack will stay in position even if the pan is moved about or tilted. The posts extending from both sides of the panels will support the rack in the same relative position even when inverted.

The handle 14, in the illustrated embodiment, is comprised of a pair of hook-shaped members 46 extending from each end of a crossbar 48 which in turn is rigidly connected to a hand grip 50 by means of a connecting brace 52. The handle is grasped by the grip 50 and the hook members 46 are used to engage the marginal portion of the rack whereby it may be picked up and turned over periodically. It will be understood that since the rack will be hot during cooking, the detachable handle permits the rack to be turned over quickly and easily without the use of insulating gloves or the like and without risk of slipping.

Referring now to FIG. 5 of the drawings there is illustrated a modification of the invention and in this embodiment a pair of matching racks 54 and 56 is provided for use on a circular outdoor grill 58. Each of the racks 54 and 56 is of semi-circular outline and dimensioned to fit onto the grill 68 which is provided with a marginal flange 60 having radially extending notches or grooves 62 to receive radially extending posts 64 from each of the racks 54 and 56. The racks 54 and 56 each is formed with a gridwork of rods 65 within a marginal semi-circular frame 66. These are in the form of a pair of panels as in the principal embodiment, each panel being connected to the other by extensible spring hinges 68 between the straight edges of the panels and extensible spring latches 70 each with hooked ends 72 about the arcuate edges and employed to secure the panels in a closed position in the same manner as the members 28 and 30 of the principal embodiment.

The semi-circular configuration of the racks permits easy turning as well as more flexibility in cooking on the grill. The two semi-circular racks can be turned more easily than a single large rack and, one type of food may be cooked in one rack while another type is being cooked in the other. This offers better control where different foods require different cooking times or techniques. Some types of meats, for example, may require longer cooking periods than others and may be placed on the grill in one of the racks while another type of meat requiring a shorter period of time may be placed in another rack to be set on the grill some time after the first rack.

Having thus described the invention what I claim and desire to obtain by Letters Patent of the United States is:

1. Variable capacity broiling equipment, comprising in combination
   (a) a pair of articulated openwork panels of corresponding size and shape,
   (b) extensible spring hinges connecting opposing edges along one side of said panels,
   (c) extensible spring latches spaced along at least another edge of one of said panels for yielding locking engagement with the opposing edge of the other panel, each of said latches being formed with a hook portion for engaging an edge of said panel and an apertured tab portion integral with said hook portion,
   (d) a plurality of spaced supports extending from the edges of said panels and in the plane thereof, and,
   (e) a pan coextensive with said panels and formed with a marginal lip having spaced indents for receiving said supports, and,
   (f) a detachable handle, said handle including a pair of hooked members adapted to selectively engage said panels or said apertured portion.

References Cited
UNITED STATES PATENTS

| | | | |
|---|---|---|---|
| 1,205,461 | 11/1916 | McCulloch | 99—402 |
| 3,033,100 | 5/1962 | Wagner | 99—402 |
| 221,407 | 11/1879 | Harrison | 99—397 |
| 939,251 | 11/1909 | Hamblin | 99—450 |
| 1,676,816 | 7/1928 | Briggs | 99—449 UX |
| 3,040,650 | 6/1962 | Watts | 99—402 |
| 1,066,552 | 7/1913 | Taylor et al. | 99—450 |
| 559,172 | 4/1896 | Hall | 99—410 |
| 2,320,304 | 5/1943 | Rosset | 99—494 X |

FOREIGN PATENTS

| | | | |
|---|---|---|---|
| 1,319,444 | 1/1963 | France | 99—450 |

WALTER A. SCHEEL, Primary Examiner

A. O. HENDERSON, Assistant Examiner

U.S. Cl. X.R.

99—450